United States Patent
Tsoy et al.

(10) Patent No.: US 10,949,499 B2
(45) Date of Patent: Mar. 16, 2021

(54) METHODS AND SYSTEMS FOR GENERATING VALUES OF OVERALL EVALUATION CRITERION

(71) Applicant: YANDEX EUROPE AG, Lucerne (CH)

(72) Inventors: Valeriya Dmitrievna Tsoy, Novosibirsk (RU); Roman Yakovlevich Budylin, Moscow (RU); Aleksey Valerievich Drutsa, Moscow (RU); Ilya Vladimirovich Katsev, Saint-Petersburg (RU)

(73) Assignee: YANDEX EUROPE AG, Lucerne (CH)

( * ) Notice: Subject to any disclaimer, the term of this patent is extended or adjusted under 35 U.S.C. 154(b) by 410 days.

(21) Appl. No.: 16/011,247

(22) Filed: Jun. 18, 2018

(65) Prior Publication Data

US 2019/0188244 A1   Jun. 20, 2019

(30) Foreign Application Priority Data

Dec. 15, 2017   (RU) .......................... RU2017144042

(51) Int. Cl.
| | |
|---|---|
| *G06F 17/18* | (2006.01) |
| *G06F 3/01* | (2006.01) |
| *G06Q 30/02* | (2012.01) |
| *G06Q 10/06* | (2012.01) |

(52) U.S. Cl.
CPC ................ *G06F 17/18* (2013.01); *G06F 3/01* (2013.01); *G06Q 10/06* (2013.01); *G06Q 30/0201* (2013.01)

(58) Field of Classification Search
CPC ........... G06F 17/18; G06F 3/01; G06Q 10/06; G06Q 30/0201
See application file for complete search history.

(56) References Cited

U.S. PATENT DOCUMENTS

| | | | |
|---|---|---|---|
| 7,617,115 | B2 | 11/2009 | McNair |
| 7,693,683 | B2 | 4/2010 | Ihara |
| 8,121,411 | B2 | 2/2012 | Kubota et al. |
| 9,003,076 | B2 | 4/2015 | Biem |
| 9,454,580 | B2 | 9/2016 | Nice et al. |
| 2002/0169730 | A1 | 11/2002 | Lazaridis |
| 2002/0174222 | A1 | 11/2002 | Cox |
| 2005/0192824 | A1 | 9/2005 | Schuetze et al. |

(Continued)

*Primary Examiner* — Regis J Betsch
(74) *Attorney, Agent, or Firm* — BCF LLP (57) ABSTRACT

A method and server for generating values of an overall evaluation criterion (OEC) to be used during a control/treatment testing is provided. The method comprises, for each of the control and treatment versions: receiving datasets indicative of user interactions; determining first sets of values of a first per-user metric; and determining second sets of values of a second per-user metric. The method comprises selecting a linearization value. The method comprises, for each one of the control and treatment versions, determining linearized sets of values where values in a given linearized set are differences between (i) values of the first set from (ii) values of the second set that are weighted by the linearization value; and generating OEC values based on the linearized sets. Difference between OEC values is indicative of a magnitude and direction of the change in interactions between the versions.

16 Claims, 3 Drawing Sheets

(56) References Cited

U.S. PATENT DOCUMENTS

| | | | |
|---|---|---|---|
| 2015/0046251 A1* | 2/2015 | Smith | G06Q 30/0242 |
| | | | 705/14.41 |
| 2016/0352767 A1 | 12/2016 | Owhadi | |
| 2017/0103334 A1 | 4/2017 | Gusev et al. | |
| 2018/0165723 A1* | 6/2018 | Wright | G06Q 10/0635 |
| 2020/0104340 A1* | 4/2020 | Liu | G06F 17/18 |

* cited by examiner

METHODS AND SYSTEMS FOR GENERATING VALUES OF OVERALL EVALUATION CRITERION

CROSS-REFERENCE

The present application claims priority to Russian Patent Application No. 2017144042, entitled "Methods and Systems for Generating Values of Overall Evaluation Criterion", filed Dec. 15, 2017, the entirety of which is incorporated herein by reference.

TECHNICAL FIELD

The present technology relates to control/treatment testing and more precisely to methods and systems for generating values of an Overall Evaluation Criterion (OEC).

BACKGROUND

In recent years, control/treatment testing has become the state-of-the-art technique for improving web services based on data-driven decisions. A control/treatment test compares two variants of a service at a time, usually a first version (a control version) and a new one (the control version having a treatment applied thereto), by exposing the control and treatment versions to two groups of users. They are utilized by many web services providers, including for example search engines, e-commerce sites and social networks, such as Amazon™, eBay™, Facebook™, Google™, LinkedIn™, Microsoft™, Netflix™, Yahoo™ and Yandex™. The largest web services have designed special experimental platforms that allow them to run control/treatment tests at large scale.

One aim of the controlled control/treatment experiment is to detect the causal "treatment effect" on user engagement of the "treatment" applied to the web service. A challenging problem is to choose an appropriate criterion applicable in practice, since this criterion should meet two crucial requirements, which often conflict.

First, the criterion should provide a quantitative value that allows making conclusions about the change in the system's quality, particularly, about the sign of that change. In other words, the value of the criterion must have a clear interpretation and be consistent with user preferences. This property is referred to as the directionality. It is known in the art that many criteria may result in contradictory interpretations and their use in practice may be misleading and, therefore, the right choice of an appropriate criterion is a difficult task.

Second, when a treatment effect exists (e.g., effect of modifications on the user behavior), the criterion has to detect the difference of the two versions of the system at a high level of statistical significance in order to distinguish the treatment effect from the noise observed when the effect does not exist. This property is referred to as the sensitivity. The common problem is the low metric sensitivity in the cases when only a subtle modification is being tested or if only a small amount of user traffic is affected by the system change.

SUMMARY

Embodiments of the present technology have been developed based on developers' appreciation of at least one technical problem associated with the prior art solutions.

Embodiments of the present technology have been developed based on developers' appreciation that while prior art solutions may be focused on employing overall evaluation criteria (OECs) that are based on commonly used user behaviour metrics, in most cases, due to the sensitivity of such user behaviour metrics, a large number of users needs to be exposed to the control and treatment versions of a given computer-implemented service in order for the operator to be confident in the interpretation of the OEC. Moreover, techniques that are currently employed for improving the sensitivity of such user behaviour metrics require a large amount of computational resources.

Therefore, developer(s) have devised method and systems of generating values of an OEC to be used during control/treatment testing of a computer-implemented service where the OEC is based on a linearized per-user metric which may be more sensitive than currently employed user behaviour metrics and may be compatible with sensitivity improving techniques that require less computational resources for execution.

According to a first broad aspect of the present technology, there is provided a method of generating values of an overall evaluation criterion (OEC) to be used during a control/treatment testing of a computer-implemented service for selecting a current version of the computer-implemented service amongst a control and a treatment version of the computer-implemented service. The method is executable by a server. The method comprises, for each one of the control and treatment versions: receiving, by the server, a respective dataset indicative of user interactions of users with the respective one of the control and treatment versions; determining, by the server, a respective first set of values based on the respective dataset where values of the first sets are values of a first per-user metric; and determining, by the server, a respective second set of values based on the respective dataset where values of the second sets are values of a second per-user metric. The method comprises selecting, by the server, a linearization value for a linearized per-user metric where the linearized per-user metric is a linear combination of the first and second per-user metrics and where the OEC is based on the linearized per-user metric. The linearization value is between a control-ratio and a treatment-ratio. The control-ratio is a ratio of (i) an average value of the values of the first set of the control version over (ii) an average value of the values of the second set of the control version. The treatment-ratio is a ratio of (i) an average value of the values of the first set of the treatment version over (ii) an average value of the values of the second set of the treatment version. The method comprises, for each one of the control and treatment versions, determining, by the server, a respective linearized set of values. Values in a given linearized set are differences between (i) the values of the respective first set from (ii) the values of the respective second set that are weighted by the linearization value. The values of the linearized sets are values of the linearized per-user metric. The method comprises, for each one of the control and treatment versions, generating, by the server, a respective value of the OEC based on the respective linearized sets. The difference between the values of the OEC is indicative of (i) a magnitude of the change in the user interactions between the control version and the treatment version and (ii) a direction of the change in the user interactions between the control version and the treatment version. The direction is one of a positive direction and a negative direction.

In some implementations of the method, the selecting the linearization value for the linearized per-user metric may comprise: determining, by the server, one of the control-ratio and the treatment-ratio; and selecting, by the server, the one of the control-ratio and the treatment-ratio as the linearization value.

In some implementations of the method, the selecting the linearization value for the linearized per-user metric may comprise: determining, by the server, a linearization value interval that comprises all values between the control-ratio and the treatment-ratio, inclusively; and selecting, by the server, any value in the linearization value interval as the linearization value.

In some implementations of the method, the method may further comprise applying, by the server, a statistical significance test to determine a significance level of the difference between the values of the OEC.

In some implementations of the method, the statistical significance test may be one of: a bootstrap test; a delta test; and a t-statistic test.

In some implementations of the method, the statistical significance test may be the t-statistic test and the method may further comprise determining, for each one of the control and treatments versions, by the server, a respective sensitivity-enhanced set of values by applying a sensitivity-enhancing algorithm to the respective linearized set of values. The generating the respective values of the OEC may comprise generating respective average values of values of the respective sensitivity-enhanced sets.

In some implementations of the method, the method may further comprise selecting one of the control version and the treatment version as the current version of the computer-implemented service based on the direction of change in the user interactions between the control and the treatment versions.

In some implementations of the method, one of the first and second per-user metrics may be one of: a number of clicks per user; a number of queries per user; and a number of sessions per user.

In some implementations of the method, the linearized per-user metric may be the linear combination of the first and second per-user metrics in accordance with:

$$L(u_i) = X(u_i) - \kappa * Y(u_i)$$

where: L is the linearized per-user metric, X is the first per-user metric, Y is the second per-user metric and κ is the linearization value.

According to a second broad aspect of the present technology, there is provided a server for generating values of an overall evaluation criterion (OEC) to be used during a control/treatment testing of a computer-implemented service for selecting a current version of the computer-implemented service amongst a control and a treatment version of the computer-implemented service. The server is configured to, for each one of the control and treatment versions: receive a respective dataset indicative of user interactions of users with the respective one of the control and treatment versions; determine a respective first set of values based on the respective dataset where values of the first sets are values of a first per-user metric; and determine a respective second set of values based on the respective dataset where values of the second sets are values of a second per-user metric. The server is configured to select a linearization value for a linearized per-user metric. The linearized per-user metric is a linear combination of the first and second per-user metrics. The OEC is based on the linearized per-user metric. The linearization value is between a control-ratio and a treatment-ratio. The control-ratio is a ratio of (i) an average value of the values of the first set of the control version over (ii) an average value of the values of the second set of the control version. The treatment-ratio is a ratio of (i) an average value of the values of the first set of the treatment version over (ii) an average value of the values of the second set of the treatment version. The server is configured to, for each one of the control and treatment versions, determine a respective linearized set of values where values in a given linearized set are differences between (i) the values of the respective first set from (ii) the values of the respective second set that are weighted by the linearization value. The values of the linearized sets are values of the linearized per-user metric. The server is configured to, for each one of the control and treatment versions, generate a respective value of the OEC based on the respective linearized sets. The difference between the values of the OEC is indicative of (i) a magnitude of the change in the user interactions between the control version and the treatment version and (ii) a direction of the change in the user interactions between the control version and the treatment version. The direction is one of a positive direction and a negative direction.

In some implementations of the server, the server configured to select the linearization value for the linearized per-user metric may further comprise the server being configured to: determine one of the control-ratio and the treatment-ratio; and select the one of the control-ratio and the treatment-ratio as the linearization value.

In some implementations of the server, the server configured to select the linearization value for the linearized per-user metric may comprise the server being configured to: determine a linearization value interval that comprises all values between the control-ratio and the treatment-ratio, inclusively; and select any value in the linearization value interval as the linearization value.

In some implementations of the server, the server may be further configured to apply a statistical significance test to determine a significance level of the difference between the values of the OEC.

In some implementations of the server, the statistical significance test may be one of: a bootstrap test; a delta test; and a t-statistic test.

In some implementations of the server, the statistical significance test may be the t-statistic test, and the server may be further configured to determine, for each one of the control and treatments versions, a respective sensitivity-enhanced set of values by applying a sensitivity-enhancing algorithm to the respective linearized set of values. The server configured to generate the respective values of the OEC may comprise the server being configured to generate respective average values of values of the respective sensitivity-enhanced sets.

In some implementations of the server, the server may be further configured to select one of the control version and the treatment version as the current version of the computer-implemented service based on the direction of change in the user interactions between the control and the treatment versions.

In some implementations of the server, one of the first and second per-user metrics may be one of: a number of clicks per user; a number of queries per user; and a number of sessions per user.

In some implementations of the server, the linearized per-user metric may be the linear combination of the first and second per-user metrics in accordance with:

$$L(u_i) = x(u_i) - \kappa * Y(u_i)$$

where: L is the linearized per-user metric, X is the first per-user metric, Y is the second per-user metric and κ is the linearization value.

In the context of the present specification, unless expressly provided otherwise, an "electronic device", a "user device", a "server", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "storage" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
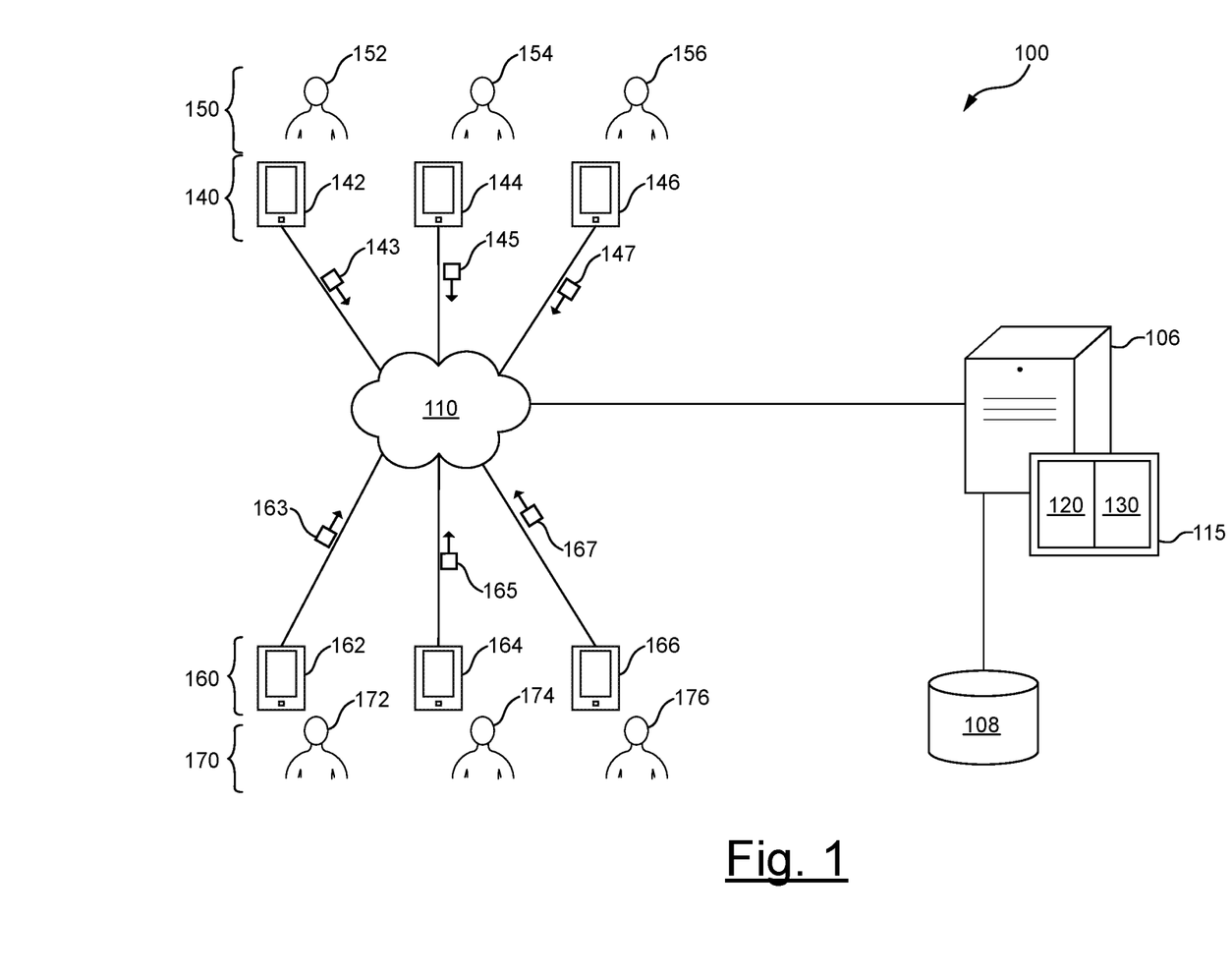
FIG. 1 is a schematic diagram of a non-limiting implementation of a system in accordance with the non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 comprises a first plurality of electronic devices 140 and a second plurality of electronic devices 160. The first plurality of electronic devices 140 comprises a first, a second and a third electronic device 142, 144 and 146. The second plurality of electronic devices 160 comprises a fourth, a fifth and a sixth electronic device 162, 164 and 166.

Each one of the first plurality of electronic devices 140 is associated with a respective user from a first plurality of users 150 and each one of the second plurality of electronic devices 160 is associated with a respective user from a second plurality of users 170. Put another way, the first electronic device 142 is associated with a first user 152 of the first plurality of users 150, the second electronic device 144 is associated with a second user 154 of the first plurality of users 150, the third electronic device 146 is associated with a third user 156 of the first plurality of users 150, the fourth electronic device 162 is associated with a fourth user 172 of the second plurality of users 170, the fifth electronic device 164 is associated with a fifth user 174 of the second plurality of users 170 and the sixth electronic device 166 is associated with a sixth user 176 of the second plurality of users 170. As such, any one of the first plurality of the electronic devices 140 or any one of the second plurality of the electronic devices 160 can sometimes be referred to as a "client device", "end user device" or "client electronic device". It should be noted that the fact that each one of the first plurality of electronic devices 140 and each one of the second plurality of electronic devices 160 is associated with a respective user does not need to suggest or imply any mode of operation—such as a need to log in, a need to be registered, or the like.

The implementation of a given electronic device from the first plurality of the electronic devices 140 or from the second plurality of the electronic devices 160 is not particularly limited, but as an example, the given electronic device may be implemented as a personal computer (desktops, laptops, netbooks, etc.), a wireless communication device (such as a smartphone, a cell phone, a tablet and the like), as well as network equipment (such as routers, switches, and gateways). The given electronic device comprises hardware and/or software and/or firmware (or a combination thereof), as is known in the art, to (i) provide access to a computer-implemented service 115 for a respective user and (ii) transmit indications of user interactions of the respective user with the computer-implemented service 115.

Generally speaking, the computer-implemented service 115 is an application implemented by a server 106, which application aims to address one or more of user's needs or problems. For example, a map service, being an example of the computer-implemented service 115, aims to solve a user problem of determining a particular route from Point A to Point B. Generally, users access the computer-implemented service 115 via respective electronic devices by accessing or logging into a pre-defined web resource hosted on the server 106.

In some implementations of the present technology, merely as an illustration and not a limitation, the computer-implemented service 115 may be the map service, a weather service, a general search engine service, a vertical search engine service, a web mail service, a cloud storage service, a delivery service and the like implemented by the server 106. How the computer-implemented service 115 is implemented by the server 106 will be further described herein below.

Each one of the first plurality of electronic devices 140 and each one of the second plurality of electronic devices 160 is communicatively coupled to a communication network 110 for accessing the server 106. In some non-limiting embodiments of the present technology, the communication network 110 can be implemented as the Internet. In other non-limiting embodiments of the present technology, the communication network 110 can be implemented differently, such as any wide-area communication network, local-area communication network, a private communication network and the like. How a communication link (not separately numbered) between a given one of either one of the first and the second pluralities of electronic devices 140 and 160 and the communication network 110 is implemented will depend inter alia on how the given one of either one of the first and the second pluralities of electronic devices 140 and 160 is implemented.

Merely as an example and not as a limitation, in those embodiments of the present technology where the given electronic device is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the given electronic device is implemented as a notebook computer, the communication link can be either wireless (such as Wireless Fidelity, or WiFi® for short, Bluetooth® or the like) or wired (such as an Ethernet based connection).

It should be noted that the first plurality of electronic devices 140 and the second plurality of electronic devices 160 are depicted in FIG. 1 as including three (3) electronic devices for the sake of simplicity only. It should be understood that the first plurality of electronic devices 140 and the second plurality of electronic devices 160 may include a large number of electronic devices such as, for example, 500, 1000, 10000, 100000 and the like of electronic devices. By the same token, the first plurality of users 150 and the second plurality of users 170 may include a large number of users such as, for example, 500, 1000, 10000, 100000 and the like of users.

The system 100 also comprises the server 106 that may be implemented as a conventional computer server. In an example of an embodiment of the present technology, the server 106 may be implemented as a Dell™ PowerEdge™ Server running the Microsoft™ Windows Server™ operating system. Needless to say, the server 106 may be implemented in any other suitable hardware, software, and/or firmware, or a combination thereof. In the depicted non-limiting embodiments of the present technology, the server 106 is a single server. In alternative non-limiting embodiments of the present technology, the functionality of the server 106 may be distributed and may be implemented via multiple servers.

The server 106 is communicatively coupled to the communication network 110 for being accessible by each one of the first plurality of electronic devices 140 and by each one of the second plurality of electronic devices 160.

The server 106 is also communicatively coupled to a database 108 that is configured to store information extracted, generated or otherwise determined by the server 106 during processing. Generally speaking, the database 108 may receive data from the server 106 that was extracted, generated or otherwise determined by the server 106 during processing for temporary and/or permanent storage thereof and may provide stored data to the server 106 for use thereof. In the depicted non-limiting embodiments of the present technology, the database 108 is a single database. In alternative non-limiting embodiments of the present technology, the functionality of the database 108 may be distributed and may be implemented via multiple databases.

As previously mentioned, the server 106 implements the computer-implemented service 115 that aims to address one or more of user's needs or problems. Generally speaking, an operator of a given computer-implemented service modifies or adjusts the given computer-implemented service, from time to time, in order to improve the way that the given computer-implemented service may address the one or more of user's needs or problems. To that end, different versions of the given computer-implemented service may be generated where each version is, in a sense, an "update" of a previous version.

An updated version of the given computer-implemented service may be generated by applying a "treatment" to a previous version. This previous version is known as a "control version" or an "A version" of the given computer-implemented service, while the updated version, which is generated by applying the "treatment" to the given control version, is known as a "treatment version" or a "B version" of the given computer-implemented service.

As depicted in FIG. 1, a control version 120 and a treatment version 130 of the computer-implemented service 115 is available on the server 106. The treatment that has been applied to the control version 120 for generating the treatment version 130 may depend on inter alia a type of the computer-implemented service 115. For example, in a case where the computer-implemented service 115 is a search engine service, the control version 120 may be treated by modifying or adjusting: an aesthetic look of the search engine service when viewed by a given user, a presentation algorithm of the search engine service, a change in ranking or search method of the search engine service and the like or any combination thereof. It is contemplated that other treatments to those non-exhaustively listed above may be applied to the control version 120 for generating the treatment version 130 without departing from the scope of the present technology.

It should be understood that since the control version 120 is different from the treatment version 130 (i.e., a treatment has been applied to the control version 120 for generating the treatment version 130), one of (i) the control version 120 and (ii) the treatment version 130 may be better address one or more of user's needs or problems than the other one of (i) the control version 120 and (ii) the treatment version 130. Therefore, a quality of the computer-implemented service 115 may be perceived differently by users depending on whether users are provided with the control version 120 thereof or the treatment version 130 thereof.

Generally speaking, a quality of a given version of a given computer-implemented service may be evaluated in terms of an Overall Evaluation Criterion (OEC) which is based on a user behavior metric that is assumed to correlate with the quality of the given version. For example, user behavior metrics on which frequently used OECs are based are, but are not limited to: click-through rate, absence time, abandonment rate, and the like.

It should be understood that a difference between (i) a value of a given OEC for the control version 120 and (ii) a value of the given OEC for the treatment version 130 (i.e., ΔOEC) may be indicative of a quality change between the control version 120 and the treatment version 130. This quality change may be attributed to a "treatment effect" caused by applying the treatment to the control version 120 for generating the treatment version 130.

The operator of the computer-implemented service 115 may be desirous of determining a given ΔOEC in order to (i) determine which one of the control version 120 and the treatment version 130 is of a better quality and (ii) select that version as a current version of the computer-implemented service 115 to be subsequently provided to users of the computer-implemented service 115.

However, two (2) requirements should be met by the given ΔOEC for the operator to be confident about the determination of which one of the control version 120 and the treatment version 130 is of a better quality.

First, the ΔOEC should provide a quantitative value that allows making conclusions about the quality change, particularly, about a sign and a magnitude of the quality change. This property is referred to as the "directionality". However, different OECs (i.e., which are based on different user behaviour metrics) are generally assumed to correlate with the quality of a given version. Therefore, depending on which user behavior metric the OEC is based on, different ΔOEC could be determined. This may result in contradictory interpretations and the use of these user behaviour metrics in practice may be misleading. Therefore, choosing an appropriate user behaviour metric on which the given OEC will be based may be a difficult task.

Second, the ΔOEC has to detect the quality change between the control version 120 and the treatment version 130 at a high level of statistical significance in order to distinguish the "treatment effect" from the noise observed when the "treatment effect" does not exist. This property is referred to as the "sensitivity". Some user behaviour metrics on which some OECs are based may have low sensitivities in cases where only a subtle modification or adjustment has been made or if only a small number of users is affected by the "treatment effect" (i.e., the number of users that are exposed to the treatment version 130). Therefore, choosing an appropriate user behaviour metric on which the given OEC will be based may be a difficult task since the detected quality change between the control version 120 and the treatment version 130 may not be statistically significant if the given OEC is based on a non-appropriate user behavior metric.

It should also be noted that in order to detect a level of statistical significance of the quality change, different statistical significance tests may be used, such as, but not limited to: a bootstrap test, a delta test, a t-statistic test and the like. However, the implementation of a particular statistical significance test depends on inter alia the user behaviour metric on which the given OEC is based. For example, there are some user behaviour metrics that may be used in conjunction with the bootstrap test and the delta test, but not the t-statistic test. The use of these user behaviour metrics on which OECs are frequently based may thus be undesirable since performing the bootstrap test or the delta test for detecting the level of statistical significance of the quality change requires higher processing power if compared to performing the t-statistic test.

Additionally, many sensitivity-enhancing algorithms, which can be used in conjunction with user behaviour metrics on which the t-statistic test is applicable, have been developed for enhancing the sensitivity of these user behaviour metrics. For example, these sensitivity-enhancing algorithms include, but not limited to: regression adjustment, future value prediction, learned linear combination and the like. Therefore, choosing a user behaviour metric on which the t-statistic test is applicable may be beneficial since the sensitivity of this user behavior metric may be enhanced.

Therefore, it is contemplated that, in some embodiments of the present technology, the server 106 is configured to use a given OEC that is based on a linearized per-user metric which is a particular user behavior metric that may resolve at least some issues mentioned above. What the linearized per-user metric is and how the server 106 uses the OEC that is based on this linearized per-user metric for detecting the quality change between the control version 120 and the treatment version 130 will now be described in further detail.

Let it be assumed that when a given one of the first plurality of electronic devices 140 requests access to the computer-implemented service 115, the server 106 provides access to the control version 120 of the computer-implemented service 115. Therefore, let it be assumed that the first plurality of users 150 interacted with the control version 120 of the computer-implemented service 115.

As such, the server 106 is configured to receive indications of user interactions of each one of the first plurality of users 150 with the control version 120 of the computer-implemented service 115. Types of user interactions are not limited but as an example, user interactions may include: user clicks, user sessions, user queries and the like.

For example, the first electronic device 142 may generate a first data packet 143, which comprises indications of user interactions of the first user 152 with the control version 120. The first data packet 143 may be sent by the first electronic device 142 via the communication network 110 and received by the server 106. Similarly, the second electronic device 144 may generate a second data packet 145, which comprises indications of user interactions of the second user 154 with the control version 120. The first data packet 143 may be sent by the second electronic device 144 via the communication network 110 and received by the server 106. The third electronic device 146 may generate a third data packet 147, which comprises indications of user interactions of the third user 156 with the control version 120. The third data packet 145 may be sent by the third electronic device 146 via the communication network 110 and received by the server 106.

Also, let it be assumed that when a given one of the second plurality of electronic devices 160 requests access to the computer-implemented service 115, the server 106 provides access to the treatment version 130 of the computer-implemented service 115. Therefore, let it be assumed that the second plurality of users 170 interacted with the treatment version 130 of the computer-implemented service 115.

As such, the server 106 is configured to receive indications of user interactions of each one of the second plurality of users 170 with the treatment version 130 of the computer-implemented service 115.

The server 106 may receive indications of user interactions of each one of the second plurality of users 170 with the treatment version 130 similarly to how the server 106 receives indications of user interactions of each one of the first plurality of users 150 with the control version 120 of the computer-implemented service 115. For example, the fourth, the fifth and the sixth electronic device 162, 164 and 166 may generate a respective fourth, fifth and sixth data packet 163, 165 and 167 which comprise indications of user interactions of the fourth, the fifth and the sixth user 172, 174 and 176, respectively, with the treatment version 130. The fourth, the fifth and the sixth data packet 163, 165 and 167 may be sent via the communication network 110 and received by the server 106.

In some embodiments of the present technology, the server 112 may be configured to store information received via the first, the second, the third, the fourth, the fifth and the sixth data packet 143, 145, 147, 163, 165 and 167 in the database 108.

Figure 2:
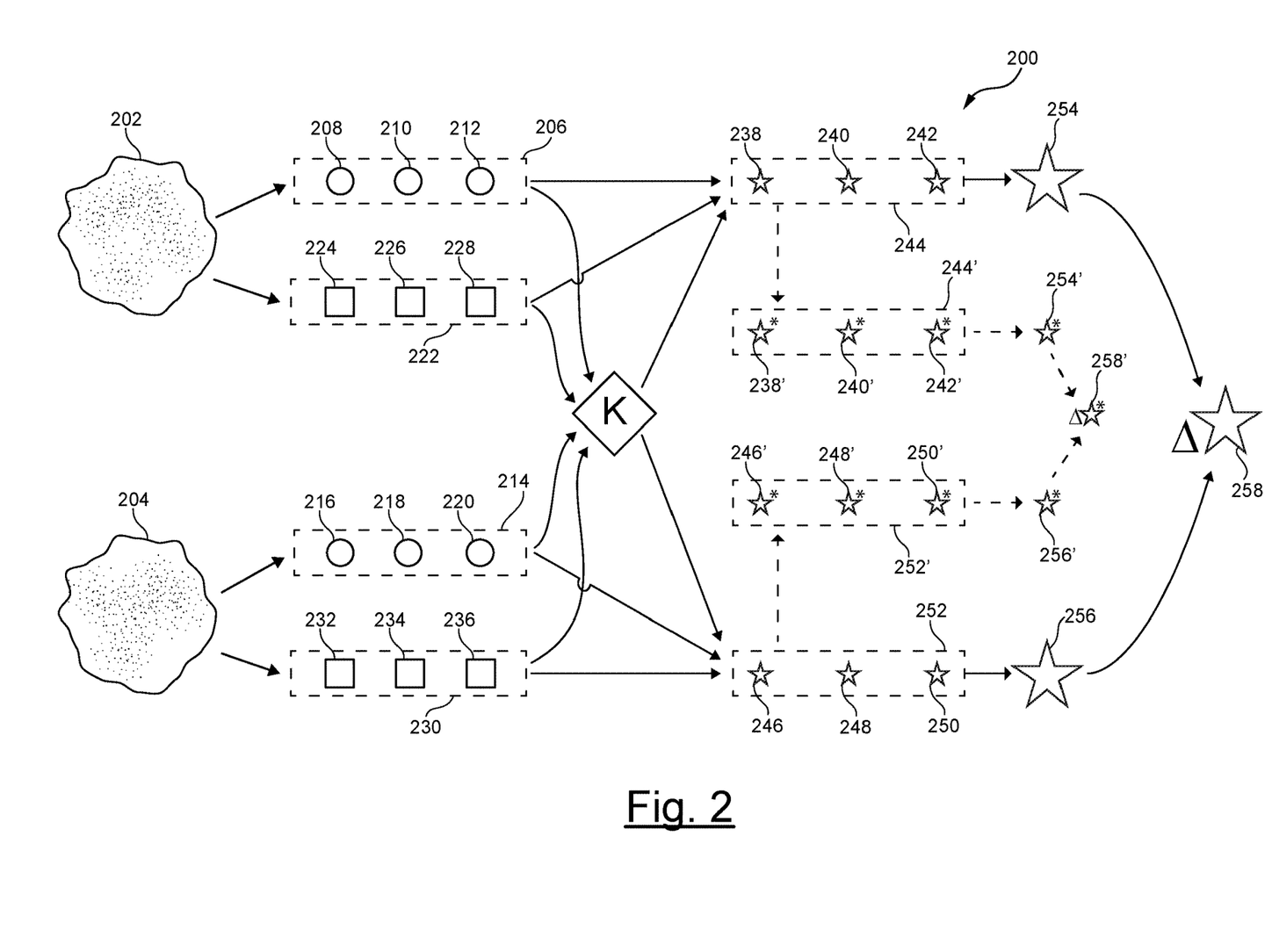
FIG. 2 is a schematic diagram of overall evaluation criteria (OECs) determination procedure executable by a server of FIG. 1 in accordance with the non-limiting embodiments of the present technology.

With reference to FIG. 2, the indications of user interactions received by the server 106 via the first, the second and the third data packet 143, 145 and 147 represent a control dataset 202 which is indicative of user interactions of the first plurality of users 150 with the control version 120 of the computer-implemented service 115. The indications of user interactions received by the server 106 via the fourth, the fifth and the sixth data packet 163, 165 and 167 represent a treatment dataset 204 which is indicative of user interactions of the second plurality of users 170 with the treatment version 130 of the computer-implemented service 115.

Generally speaking, the server 106 is configured to determine values of a first per-user metric and of a second per-user metric from the control dataset 202 and from the treatment dataset 204. A given per-user metric is a user behavior metric for which a value thereof can be determined for each individual user. In other words, values of a given per-user metric are determined on a user-by-user basis. Examples of per-user metrics include, but are not limited to: a number of clicks per user, a number of queries per user, a number of sessions per user, and the like. Therefore, as an example only, in the case where the given per-user metric is the number of sessions per user, the value of the given per-user metric can be five (5) sessions for a first given user and three (3) sessions for a second given user.

As such, the server 106 is configured to determine a first control set of values 206 based on the control dataset 202 such that values 208, 210 and 212 of the first control set of values 206 are values of the first per-user metric for a respective one of the first plurality of users 150.

As an illustration, let it be assumed that the first per-user metric is a number of clicks per user. This means that the server 106 is configured to determine based on the control dataset 202, the number of clicks that each user of the first plurality of users 150 performed on the control version 120 of the computer-implemented service 115. In this example, the server 106 may determine that the value 208 is the number of clicks that the first user 152 performed on the control version 120. Also in this example, the server 106 may determine that the value 210 is the number of clicks that the second user 154 performed on the control version 120. Further in this example, the server 106 may determine that the value 212 is the number of clicks that the third user 156 performed on the control version 120.

Similarly, the server 106 is configured to determine a first treatment set of values 214 based on the treatment dataset 204 such that values 216, 218 and 220 of the first treatment set of values 214 are values of the first per-user metric for a respective one of the second plurality of users 170.

In other words, the server 106 is configured to determine based on the treatment dataset 204 the number of clicks that each user of the second plurality of users 170 performed on the treatment version 130 of the computer-implemented service 115. In this example, the server 106 may determine that the value 216 is the number of clicks that the fourth user 172 performed on the treatment version 130. Also in this example, the server 106 may determine that the value 218 is the number of clicks that the fifth user 174 performed on the treatment version 130. Further in this example, the server 106 may determine that the value 220 is the number of clicks that the sixth user 176 performed on the treatment version 130.

Therefore, it can be said that the server 106 is configured to determine the first control set of values 206 and the first treatment set of values 214 for the control version 120 and the treatment version 130, respectively, where the values 208, 210 and 212 are values of the first per-user metric for the control version 120 and where the values 216, 218 and 220 are values of the first per-user metric for the treatment version 130.

The server 106 is configured to determine a second control set of values 222 and a second treatment set of values 230 for the second per-user metric.

The server 106 is configured to determine the second control set of values 222 based on the control dataset 202 such that values 224, 226 and 228 of the second control set of values 222 are values of the second per-user metric.

As an illustration, let it be assumed that the second per-user metric is a number of queries per user. This means that the server 106 is configured to determine based on the control dataset 202, the number of queries that each user of the first plurality of users 150 performed on the control version 120 of the computer-implemented service 115. In this example, the server 106 may determine that the value 224 is the number of queries that the first user 152 performed on the control version 120. Also in this example, the server 106 may determine that the value 226 is the number of queries that the second user 154 performed on the control version 120. Further in this example, the server 106 may determine that the value 228 is the number of queries that the third user 156 performed on the control version 120.

Similarly, the server 106 is configured to determine the second treatment set of values 230 based on the treatment dataset 204 such that values 232, 234 and 236 of the second treatment set of values 230 are values of the second per-user metric.

In other words, the server 106 is configured to determine based on the treatment dataset 204 the number of queries that each user of the second plurality of users 170 performed on the treatment version 130 of the computer-implemented service 115. In this example, the server 106 may determine that the value 232 is the number of queries that the fourth user 172 performed on the treatment version 130. Also in this example, the server 106 may determine that the value 234 is the number of queries that the fifth user 174 performed on the treatment version 130. Further in this example, the server 106 may determine that the value 236 is the number of queries that the sixth user 176 performed on the treatment version 130.

Therefore, it can be said that the server 106 is configured to determine the second control and the second treatment sets of values 222 and 230 for the control and treatment versions 120 and 130, respectively, where the values 224, 226 and 228 are values of the second per-user metric for the control version 120 and where the values 232, 234 and 236 are values of the second per-user metric for the treatment version 130.

In summary, it can be said that the server 106 is configured to determine a pair of values for (i) each one of the first plurality of users 150 that interacted with the control version 120 and (ii) each one of the second plurality of users 170 that interacted with the treatment version 130. Also, one of each pair of values is a value of the first per-user metric and the other one of each pair of values is a value of the second per-user metric. This means that the server 106 is configured to determine:

- for the first user 152 the value 208 (value of the first per-user metric for the first user 152) and the value 224 (value of the second per-user metric for the first user 152);
- for the second user 154 the value 210 (value of the first per-user metric for the second user 154) and the value 226 (value of the second per-user metric for the second user 154);
- for the third user the value 212 (value of the first per-user metric for the third user 156) and the value 228 (value of the second per-user metric for the third user 156);
- for the fourth user 172 the value 216 (value of the first per-user metric for the fourth user 172) and the value 232 (value of the second per-user metric for the fourth user 172);
- for the fifth user 174 the value 218 (value of the first per-user metric for the fifth user 174) and the value 234 (value of the second per-user metric for the fifth user 174); and
- for the sixth user 176 the value 220 (value of the first per-user metric for the sixth user 176) and the value 236 (value of the second per-user metric for the sixth user 176).

As previously mentioned, the server 106 is configured to use the given OEC, for evaluating and comparing qualities of the control version 102 and the treatment version 130, that is based on the linearized per-user metric. It is contemplated that the linearized per user metric is a linear combination of the first per-user metric and the second per-user metric.

The linearized per-user metric (e.g., the linear combination of the first per-user metric and the second per-user metric) may be determined in accordance with equation (1):

$$L(u_i) = X(u_i) - \kappa * Y(u_i) \qquad (1)$$

where X is the first per-user metric, Y is the second per-user metric and $\kappa$ is a linearization value. As such, $L(u_i)$ being a given value of the linearized per-user metric for a given user i is based on (i) $X(u_i)$ being a given value of the first per-user metric for the given user i, (ii) $Y(u_i)$ being a given value of the second per-user metric for the given user i and (iii) the linearization value $\kappa$. Put another way, $L(u_i)$ is a difference between $X(u_i)$ and a weighted $Y(u_i)$ (i.e., weighted by $\kappa$).

In some embodiments of the present technology, the server 106 is configured to determine a given value of a linearized per-user metric (i.e., $L(u_i)$) for each one of the first plurality of users 150 and each one of the second plurality of users 170. However, in order for the server 106 to determine values of the linearized per-user metric, the linearization value $\kappa$ needs to be selected. How the selection of the linearization value $\kappa$ may be executed by the server 106 will now be described.

In some embodiments of the present technology, the server 106 may be configured to determine one of (i) a control-ratio $R_c$ and (ii) a treatment-ratio $R_t$ and select it as the linearization value $\kappa$. The server 106 may configured to determine the control-ratio $R_c$ and the treatment-ratio $R_t$ according to equations (2) and (3), respectively:

$$R_c = \sum_{u_i \in U_c} X(u_i) \Big/ \sum_{u_i \in U_c} Y(u_i) \qquad (2)$$

$$R_t = \sum_{u_i \in U_t} X(u_i) \Big/ \sum_{u_i \in U_t} Y(u_i) \qquad (3)$$

where $U_c$ is the first plurality of users 150 and $U_t$ is the second plurality of users 170.

The control-ratio $R_c$ is a ratio of (i) an average value of the values 208, 210 and 212 of the first control set of values 206 over (ii) an average value of the values 224, 226 and 228 of the second control set of values 222. The treatment-ratio $R_t$ is a ratio of (i) an average value of the values 216, 218 and 220 of the first treatment set of values 214 over (ii) an average value of the values 232, 234 and 236 of the second treatment set of values 230.

It should be noted that the server 106 may employ various averaging methods in order to determine a given average value of a respective set of values. For example, in one implementation, a given average value may be a given mean value of a respective set of values. However, in other implementations, a given average value may be one of (i) a given median value and (ii) a given mode value of values of a respective set of values without departing from the scope of the present technology.

In other embodiments, the linearization value $\kappa$ may be selected from a linearization value interval which is defined by equation (4):

$$\kappa \in [\min\{R_c, R_t\}, \max\{R_c, R_t\}] \qquad (4)$$

As such, the linearization value $\kappa$ is an element of the linearization value interval that includes all values between the control-ratio $R_c$ and the treatment-ratio $R_t$ as well as the value of the control-ratio $R_c$ and the value of the treatment-ratio $R_t$. In other words, $\kappa$ may be equal to (i) $R_c$, (ii) $R_t$ or (iii) any value between $R_c$ and $R_t$.

It is contemplated that the server 106 may be configured to determine both the control-ratio $R_c$ and the treatment-ratio $R_t$ for determining the linearization value interval according to the equation (4). As such, the server 106 may then be configured to select any given value within the linearization value interval (i.e., any given value between the control-ratio $R_c$ and the treatment-ratio $R_t$, inclusively) as the linearization value $\kappa$.

It is also contemplated that, once the linearization value interval is determined by the server 106, the server 106 may provide the linearization value interval to the operator of the computer-implemented service 115 for the selection of any given value within the linearization value interval as the linearization value $\kappa$.

As previously mentioned, the server 106 is configured to determine a given value of a linearized per-user metric (i.e., $L(u_i)$) for each one of the first plurality of users 150 and each one of the second plurality of users 170. As such, the server 106 is configured to determine a control linearized set of values 244 for the first plurality of users 150 (i.e., users that interacted with the control version 120) and a treatment linearized set of values 252 for the second plurality of users 170 (i.e., users that interacted with the treatment version 130).

The server 106 is configured to determine the control linearized set of values 244 based on (i) the first control set of values 206, (ii) the second control set of values 222 and (iii) the linearization value κ. Each value in the control linearized set of values 244 is determined by the equation (1) for a respective user of the first plurality of users 150. In other words, each value of the control linearized set of values 244 is a value of the linearized per-user metric for a respective user of the first plurality of users 150.

It should be noted that a value 238 of the control linearized set of values 244 for the first user 152 is a difference between the value 208 of the first control set of values 206 and the value 224 of the second control set of values 222, where the value 224 is weighted by the linearization value κ. Also, a value 240 of the control linearized set of values 244 for the second user 154 is a difference between the value 210 of the first control set of values 206 and the value 226 of the second control set of values 222, where the value 226 is weighted by the linearization value κ. Moreover, a value 242 of the control linearized set of values 244 for the third user 156 is a difference between the value 212 of the first control set of values 206 and the value 228 of the second control set of values 222, where the value 228 is weighted by the linearization value κ.

The server 106 is also configured to determine the treatment linearized set of values 252 based on (i) the first treatment set of values 214, (ii) the second treatment set of values 230 and (iii) the linearization value κ. Each value in the treatment linearized set of values 240 is determined by the equation (1) for a respective user of the second plurality of users 170. In other words, each value of the treatment linearized set of values 252 is a value of the linearized per-user metric for a respective user of the second plurality of users 170.

It should be noted that a value 246 of the treatment linearized set of values 252 for the fourth user 172 is a difference between the value 216 of the first treatment set of values 214 and the value 232 of the second treatment set of values 230, where the value 232 is weighted by the linearization value κ. Also, a value 248 of the treatment linearized set of values 252 for the fifth user 174 is a difference between the value 218 of the first treatment set of values 214 and the value 234 of the second treatment set of values 230, where the value 234 is weighted by the linearization value κ. Moreover, a value 250 of the treatment linearized set of values 252 for the sixth user 176 is a difference between the value 220 of the first treatment set of values 214 and the value 236 of the second treatment set of values 230, where the value 236 is weighted by the linearization value κ.

In summary, it can be said that the server 106 is configured to determine the control and the treatment linearized sets of values 244 and 252, which include a respective value of the linearized per-user metric for each one of the first plurality of users 150 and for each one of the second plurality of users 170.

As previously mentioned, the server 106 is configured to use the given OEC, for evaluating and comparing qualities of the control version 102 and the treatment version 130, that is based on the linearized per-user metric. To that end, the server 106 is configured to generate a respective value of the given OEC for each one of the control version 120 and the treatment version 130 based on the control and the treatment linearized sets of values 244 and 252.

In some embodiments of the present technology, the server 106 is configured to generate (i) a control value 254 of the given OEC for the control version 120 based on the control linearized set of values 244 and (ii) a treatment value 256 of the given OEC for the treatment version 130 based on the treatment linearized set of values 252. For example, the server 106 may determine an average value of the values 238, 240 and 242 of the control linearized set of values 244 and use it as the control value 254 of the given OEC for the control version 120. The server 106 may determine an average value of the values 246, 248 and 250 of the treatment linearized set of values 252 and use it as the treatment value 256 of the given OEC for the treatment version 130.

In other embodiments of the present technology, the server 106 may be configured to apply a given sensitivity-enhancing algorithm to each one of the control and the treatment linearized set of values 244 and 256 for determining a control sensitivity-enhanced set of values 244' and a treatment sensitivity-enhanced set of values 252', respectively. As previously mentioned, the given sensitivity-enhancing algorithm may be one of: regression adjustment, future value prediction, learned linear combination and the like. It can be said that applying the given sensitivity-enhancing algorithm may increase the sensitivity of the linearized per-user metric. In other words, by applying the given sensitivity-enhancing algorithm to the linearized per-user metric may generate a sensitivity-enhanced linearized per-user the sensitivity of which may be increased in comparison to the linearized per-user metric.

In those embodiments where the server 106 is configured to apply the given sensitivity-enhancing algorithm to each one of the control and the treatment linearized sets of values 244 and 256, the server 106 may be configured to generate a control sensitivity-enhanced value 254' of the given OEC and a treatment sensitivity-enhanced value 256' of the given OEC based on the control and the treatment sensitivity-enhanced linearized sets of values 244' and 256', respectively. For example, the server 106 may determine an average value of sensitivity-enhanced values 238', 240' and 242' of the sensitivity-enhanced control linearized set of values 244' and use it as the control sensitivity-enhanced value 254' of the given OEC for the control version 120. The server 106 may determine an average value of sensitivity-enhanced values 246', 248' and 250' of the treatment sensitivity-enhanced linearized set of values 252' and use it as the treatment sensitivity-enhanced value 256' of the given OEC for the treatment version 130.

It should be understood that the control value 254 and the control sensitivity-enhanced value 254' of the given OEC for the control version 120 is indicative of users interactions of the first plurality of users 150 with the control version 120 and may correlate to the quality of the control version 120 as perceived by the first plurality of users 150. Also, the treatment value 256 and the treatment sensitivity-enhanced value 256' of the given OEC for the treatment version 130 is indicative of user interactions of the second plurality of users 170 with the treatment version 130 and may correlate to the quality of the treatment version 130 as perceived by the second plurality of users 170.

In some embodiments, the server 106 may be configured to determine a difference 258 between (i) the control value 254 of the given OEC and (ii) the treatment value 256 of the given OEC, where the difference 258 is indicative of (i) a magnitude of the change in the user interactions between the control version 120 and the treatment version 130 and (ii) a direction of the change in the user interactions between the control version 120 and the treatment version 130.

The magnitude of the change in the user interactions between the control version 120 and the treatment version 130 is the absolute value of the difference 258. The direction of the change in the user interactions between the control version 120 and the treatment version 130 is the sign of the difference 258. Therefore, it can be said that the direction of the change may be either positive or negative.

In other embodiments, the server 106 may be configured to determine a sensitivity-enhanced difference 258' between (i) the control sensitivity-enhanced value 254' of the given OEC and (ii) the treatment sensitivity-enhanced value 256' of the given OEC, where the sensitivity-enhanced difference 258' is also indicative of (i) a magnitude of the change in the user interactions between the control version 120 and the treatment version 130 and (ii) a direction of the change in the user interactions between the control version 120 and the treatment version 130.

In some embodiments of the present technology, the server 106 may further apply a given statistical significance test to determine a significance level of the difference 258. For example, the server 106 may apply one of the bootstrap test, the delta test and the t-statistic test for determining the significance level of the difference 258. It is however contemplated that other statistical significance tests known in the art may be applied by the server 106 in order to determine the significance level of the difference 258 without departing from the scope of the present technology.

In other embodiments of the present technology, it is contemplated that the server 106 may apply the t-statistic test to determine a significance level of the difference 258'.

It is contemplated that the sensitivity-enhanced difference 258' is more likely to be statistically significant than the difference 258 when the sensitivity of the linearized per-user metric is increased following the application of the given sensitivity-enhancing algorithm. It is also contemplated that applying the t-statistic test for determining the significance level of the difference 258 may require less computational resources than applying either one of the bootstrap test and the delta test for determining the significance level of the difference 258.

In some embodiments of the present technology, if the server 106 determines that the difference 258 or the difference 258' is statistically significant, the server 106 may be configured to select one of the control version 120 and the treatment version 130 as the current version of the computer-implemented service 115 based on the direction of change in the user interactions between the control and the treatment versions 120 and 130.

In one embodiment, if the server 106 determines that the difference 258 is statistically significant, the server 106 may be configured to select one of the control version 120 and the treatment version 130 as the current version of the computer-implemented service 115 based on the sign of the difference 258.

In another embodiment, if the server 106 determines that the difference 258' is statistically significant, the server 106 may be configured to select one of the control version 120 and the treatment version 130 as the current version of the computer-implemented service 115 based on the sign of the difference 258'.

Figure 3:
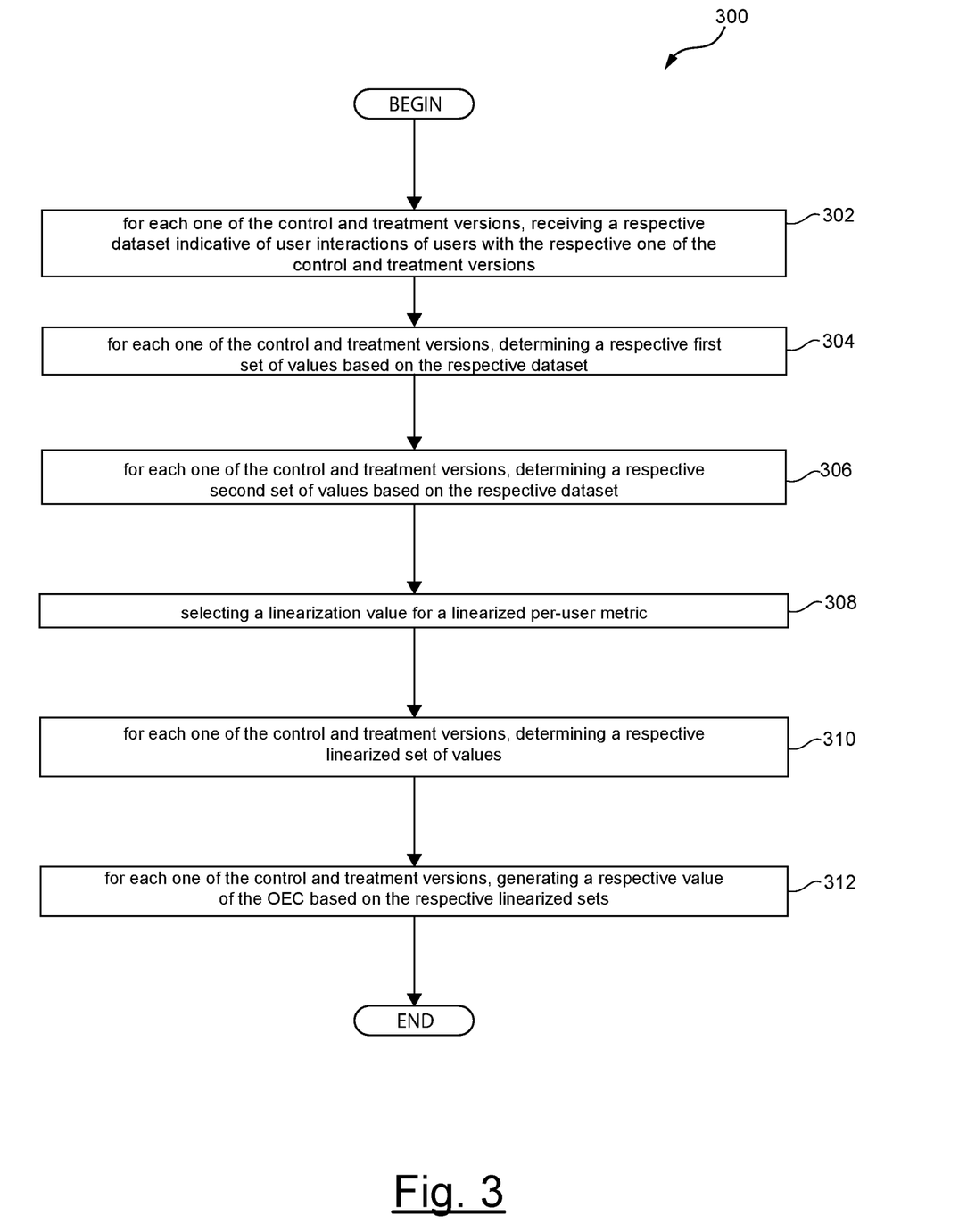
FIG. 3 is a flowchart illustrating the non-limiting implementation of a method determining an overall evaluation criterion (OEC) usable during control/treatment testing of a computer-implemented service in accordance with the non-limiting embodiments of the present technology.

In some embodiments of the present technology, the server 106 may be configured to execute a method 300 of generating values of the given OEC to be used during a control/treatment testing of the computer-implemented service 115 for selecting the current version of the computer-implemented service 115 amongst the control and treatment versions 120 and 130 of the computer-implemented service 115. The method 300 will now be described in further detail.

STEP 302: For Each One of the Control and Treatment Versions, Receiving a Respective Dataset Indicative of User Interactions of Users with the Respective One of the Control and Treatment Versions The method 300 begins at step 302 with the server 106 being configured to receive the control dataset 202 for the control version 120 and the treatment dataset 204 for the treatment version 130 (see FIGS. 1 and 2).

For example, the server 106 may receive the first, the second and the third data packet 143, 145 and 147 from the first, the second and the third electronic device 142, 144 and 146, respectively, which include indications of user interactions of the first, the second and the third user 152, 154 and 156, respectively, with the control version 120. The indications of user interactions of the first, the second and the third user 152, 154 and 156 represent the control dataset 202.

In another example, the server 106 may receive the fourth, the fifth and the sixth data packet 163, 165 and 167 from the fourth, the fifth and the sixth electronic device 162, 164 and 166, respectively, which include indications of user interactions of the fourth, the fifth and the sixth user 172, 174 and 176, respectively, with the treatment version 130. The indications of user interactions of the fourth, the fifth and the sixth user 172, 174 and 176 represent the treatment dataset 204.

In some embodiments, the indications of user interactions of the first, the second and the third user 152, 154 and 156 with the control version 120 may be stored in the database 108 and may be retrieved therefrom as the control dataset 202 for the control version 120. In other embodiments, the indications of user interactions of the fourth, the fifth and the sixth user 172, 174 and 176 with the treatment version 130 may be stored in the database 108 and may be retrieved therefrom as the treatment dataset 204 for the treatment version 130.

STEP 304: For Each One of the Control and Treatment Versions, Determining a Respective First Set of Values Based on the Respective Dataset The method 300 continues to step 304 with the server 106 being configured to determine the first control set of values 206 and the first treatment set of values 214 for the control version 120 and for the treatment version 130, respectively (see FIGS. 1 and 2). The first control and treatment sets of values 206 and 214 include values of the first per-user metric.

A given per-user metric is a type of user behavior metric for which a value thereof can be determined for each individual user. In other words, values of a given per-user metric are determined on a user-by-user basis. Examples of per-user metrics include, but are not limited to: a number of clicks per user, a number of queries per user, a number of sessions per user, and the like.

The server 106 is configured to determine the first control set of values 206 based on the control dataset 202 such that the values 208, 210 and 212 of the first control set of values 206 are values of the first per-user metric for a respective one of the first plurality of users 150. Similarly, the server 106 is configured to determine the first treatment set of values 214 based on the treatment dataset 204 such that the values 216, 218 and 220 of the first treatment set of values 214 are values of the first per-user metric for a respective one of the second plurality of users 170.

Therefore, it can be said that the server 106 is configured to determine the first control and the first treatment sets of values 206 and 214 for the control and treatment versions 120 and 130, respectively, where the values 208, 210 and 212 are values of the first per-user metric for the control version 120 and where the values 216, 218 and 220 are values of the first per-user metric for the treatment version 130.

STEP 306: For Each One of the Control and Treatment Versions, Determining a Respective Second Set of Values Based on the Respective Dataset The method 300 continues to step 306 with the server 106 being configured to determine the second control set of values 222 and the second treatment set of values 230 for the control version 120 and for the treatment version 130, respectively (see FIGS. 1 and 2). The second control and treatment sets of values 222 and 230 include values of the second per-user metric.

The server 106 is configured to determine the second control set of values 222 based on the control dataset 202 such that the values 224, 226 and 228 of the second control set of values 222 are values of the second per-user metric for a respective one of the first plurality of users 150. Also, the server 106 is configured to determine the second treatment set of values 230 based on the treatment dataset 204 such that the values 232, 234 and 236 of the second treatment set of values 230 are values of the second per-user metric for a respective one of the second plurality of users 170.

Therefore, it can be said that the server 106 is configured to determine the second control and the second treatment sets of values 222 and 230 for the control and treatment versions 120 and 130, respectively, where the values 224, 226 and 228 are values of the second per-user metric for the control version 120 and where the values 232, 234 and 236 are values of the second per-user metric for the treatment version 130.

It is contemplated that, by executing of the steps 304 and 306 of the method 300, the server 106 is configured to determine:
- for the first user 152 the value 208 (value of the first per-user metric for the first user 152) and the value 224 (value of the second per-user metric for the first user 152);
- for the second user 154 the value 210 (value of the first per-user metric for the second user 154) and the value 226 (value of the second per-user metric for the second user 154);
- for the third user the value 212 (value of the first per-user metric for the third user 156) and the value 228 (value of the second per-user metric for the third user 156);
- for the fourth user 172 the value 216 (value of the first per-user metric for the fourth user 172) and the value 232 (value of the second per-user metric for the fourth user 172);
- for the fifth user 174 the value 218 (value of the first per-user metric for the fifth user 174) and the value 234 (value of the second per-user metric for the fifth user 174); and
- for the sixth user 176 the value 220 (value of the first per-user metric for the sixth user 176) and the value 236 (value of the second per-user metric for the sixth user 176).

It is contemplated that the server 106 may be configured to store (i) the first control set of values 206 and (ii) the second control set of values 222 in association with the control version 120 of the computer-implemented service 115 in the database 108. The server 106 may also be configured to store (i) the first treatment set of values 214 and (ii) the second treatment set of values 230 in association with the treatment version 130 of the computer-implemented service 115 in the database 108.

STEP 308: Selecting a Linearization Value for a Linearized Per-User Metric

The method 300 continues to step 308 with the server 106 being configured to select the linearization value κ for the linearized per-user metric. As previously mentioned, the server 106 is configured to use the given OEC, for evaluating and comparing qualities of the control version 102 and the treatment version 130, that is based on the linearized per-user metric.

It is contemplated that the linearized per user metric is a linear combination of the first per-user metric and the second per-user metric. The linearized per-user metric may be defined by the equation (1) where a given value of the linearized per-user metric $L(u_i)$ for a given user i is a difference between a given value of the first per-user metric $X(u_i)$ and a given value of the second per-user metric $Y(u_i)$ where the given value of the second per-user metric $Y(u_i)$ is weighted by the linearization value κ.

In some embodiments of the present technology, the server 106 may be configured to determine one of (i) the control-ratio $R_c$ and (ii) the treatment-ratio $R_t$ and select the value thereof as the linearization value κ. The server 106 may be configured to determine the control-ratio $R_c$ based on the first and second control sets of values 206 and 222 according to the equation (2). The server 106 may be configured to determine the treatment-ratio $R_t$ based on the first and second treatment sets of values 214 and 230 according to the equation (3).

The control-ratio $R_c$ is the ratio of (i) the average value of the values 208, 210 and 212 of the first control set of values 206 over (ii) the average value of the values 224, 226 and 228 of the second control set of values 222. The treatment-ratio $R_t$ is the ratio of (i) the average value of the values 216, 218 and 220 of the first treatment set of values 214 over (ii) the average value of the values 232, 234 and 236 of the second treatment set of values 230.

It should be noted that the server 106 may employ various averaging methods in order to determine a given average value of a respective set of values. For example, in one implementation, a given average value may be a given mean value of a respective set of values. However, in other implementations, a given average value may be one of (i) a given median value and (ii) a given mode value of values of a respective set of values without departing from the scope of the present technology.

In other embodiments of the present technology, the server 106 may be configured to determine both (i) the control-ratio $R_c$ and (ii) the treatment-ratio $R_t$ for determining the linearization value interval according to the equation (4). As such, the server 106 may be configured to select any given value within the linearization value interval (i.e., any given value between the control-ratio $R_c$ and the treatment-ratio $R_t$, inclusively) as the linearization value κ.

It is contemplated that the server 106 may provide the linearization value interval to the operator of the computer-implemented service 115 for the selection of any given value within the linearization value interval as the linearization value κ.

It is also contemplated that the server 106 may be configured to store any one of (i) the control-ratio $R_c$, (ii) the treatment-ratio $R_t$ and (iii) the linearization value interval in the database 108. The server 106 may also be configured to store the selected linearization value κ in the database 108.

STEP 310: For Each One of the Control and Treatment Versions, Determining a Respective Linearized Set of Values The method 300 continues to step 310 with the server 106 being configured to determine the control and the treatment linearized sets of values 244 and 252 for the control and treatment versions 120 and 130, respectively. The values of the control and the treatment linearized sets of values 244 and 252 are values of the linearized per-user metric and are determined according to the equation (1).

The server 106 is configured to determine the control linearized set of values 244 based on (i) the first control set of values 206, (ii) the second control set of values 222 and (iii) the linearization value κ. Each value in the control linearized set of values 244 is determined for a respective user of the first plurality of users 150. In other words, each value of the control linearized set of values 244 is the value of the linearized per-user metric for a respective user of the first plurality of users 150.

The server 106 is also configured to determine the treatment linearized set of values 252 based on (i) the first treatment set of values 214, (ii) the second treatment set of values 230 and (iii) the linearization value κ. Each value in the treatment linearized set of values 240 is determined for a respective user of the second plurality of users 170. In other words, each value of the treatment linearized set of values 252 is the value of the linearized per-user metric for a respective user of the second plurality of users 170.

It is contemplated that the server 106 may be configured to store the control and the treatment linearized sets of values 244 and 252 in association with the control and the treatment versions 120 and 130, respectively, in the database 108.

STEP 312: For Each One of the Control and Treatment Versions, Generating a Respective Value of the OEC Based on the Respective Linearized Sets The method 300 continues to step 312 with the server 106 being configured to generate a respective value of the given OEC for each one of the control version 120 and the treatment version 130. As previously mentioned, the server 106 is configured to use the given OEC, for evaluating and comparing qualities of the control version 102 and the treatment version 130, that is based on the linearized per-user metric.

In some embodiments of the present technology, the server 106 is configured to generate (i) the control value 254 of the given OEC for the control version 120 based on the control linearized set of values 244 and (ii) the treatment value 256 of the given OEC for the treatment version 130 based on the treatment linearized set of values 252.

For example, the server 106 may determine the average value of the values 238, 240 and 242 of the control linearized set of values 244 and use it as the control value 254 of the given OEC for the control version 120. The server 106 may determine the average value of the values 246, 248 and 250 of the treatment linearized set of values 252 and use it as the treatment value 256 of the given OEC for the treatment version 130.

In other embodiments of the present technology, the server 106 may be configured to apply a given sensitivity-enhancing algorithm to each one of the control and the treatment linearized set of values 244 and 256 for determining the control sensitivity-enhanced set of values 244' and the treatment sensitivity-enhanced set of values 252', respectively.

The given sensitivity-enhancing algorithm may be one of: regression adjustment, future value prediction, learned linear combination and the like. It can be said that applying the given sensitivity-enhancing algorithm may increase the sensitivity of the linearized per-user metric.

In those embodiments where the server 106 is configured to apply the given sensitivity-enhancing algorithm to each one of the control and the treatment linearized sets of values 244 and 256, the server 106 may be configured to generate the control sensitivity-enhanced value 254' of the given OEC and the treatment sensitivity-enhanced value 256' of the given OEC based on the control and the treatment sensitivity-enhanced linearized sets of values 244' and 256', respectively.

Therefore, it can be said that the server 106 may use a given sensitivity-enhanced OEC, for evaluating and comparing qualities of the control version 102 and the treatment version 130, which is based on the sensitivity-enhanced linearized per-user metric.

For example, the server 106 may determine the average value of sensitivity-enhanced values 238', 240' and 242' of the sensitivity-enhanced control linearized set of values 244' and use it as the control sensitivity-enhanced value 254' of the given OEC for the control version 120. The server 106 may determine the average value of sensitivity-enhanced values 246', 248' and 250' of the treatment sensitivity-enhanced linearized set of values 252' and use it as the treatment sensitivity-enhanced value 256' of the given OEC for the treatment version 130.

It should be understood that the control value 254 and the control sensitivity-enhanced value 254' of the given OEC for the control version 120 is indicative of users interactions of the first plurality of users 150 with the control version 120 and may correlate to the quality of the control version 120 as perceived by the first plurality of users 150. Also, the treatment value 256 and the treatment sensitivity-enhanced value 256' of the given OEC for the treatment version 130 is indicative of user interactions of the second plurality of users 170 with the treatment version 130 and may correlate to the quality of the treatment version 130 as perceived by the second plurality of users 170.

In some embodiments, the server 106 may be configured to determine the difference 258 between (i) the control value 254 of the given OEC and (ii) the treatment value 256 of the given OEC, where the difference 258 is indicative of (i) a magnitude of the change in the user interactions between the control version 120 and the treatment version 130 and (ii) a direction of the change in the user interactions between the control version 120 and the treatment version 130.

The magnitude of the change in the user interactions between the control version 120 and the treatment version 130 is the absolute value of the difference 258. The direction of the change in the user interactions between the control version 120 and the treatment version 130 is the sign of the difference 258 and, therefore, is either positive or negative.

In other embodiments, the server 106 may be configured to determine the sensitivity-enhanced difference 258' between (i) the control sensitivity-enhanced value 254' of the given OEC and (ii) the treatment sensitivity-enhanced value 256' of the given OEC, where the sensitivity-enhanced difference 258' is also indicative of (i) a magnitude of the change in the user interactions between the control version 120 and the treatment version 130 and (ii) a direction of the change in the user interactions between the control version 120 and the treatment version 130.

In some embodiments of the present technology, the server 106 may further apply a given statistical significance test to determine a significance level of the difference 258. For example, the server 106 may apply one of the bootstrap test, the delta test and the t-statistic test for determining the significance level of the difference 258. It is however contemplated that other statistical significance tests known in the art may be applied by the server 106 in order to determine the significance level of the difference 258 without departing from the scope of the present technology.

In other embodiments of the present technology, it is contemplated that the server 106 may apply the t-statistic test to determine a significance level of the sensitivity-enhanced difference 258'.

It is contemplated that the sensitivity-enhanced difference 258' is more likely to be statistically significant than the difference 258. It is also contemplated that applying the t-statistic test for determining the significance level of the difference 258 may require less computational resources than applying either one of the bootstrap test and the delta test for determining the significance level of the difference 258.

In some embodiments of the present technology, if the difference 258 or the difference 258' is determined to be statistically significant by the server 106, the server 106 may be configured to select one of the control version 120 and the treatment version 130 as the current version of the computer-implemented service 115 based on the direction of change in the user interactions between the control and the treatment versions 120 and 130.

In one embodiment, if the server 106 determined that the difference 258 is statistically significant, the server 106 may be configured to select one of the control version 120 and the treatment version 130 as the current version of the computer-implemented service 115 based on the sign of the difference 258.

In another embodiment, if the server 106 determined that the difference 258' is statistically significant, the server 106 may be configured to select one of the control version 120 and the treatment version 130 as the current version of the computer-implemented service 115 based on the sign of the sensitivity-enhanced difference 258'.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

It should be expressly understood that not all technical effects mentioned herein need to be enjoyed in each and every implementation of the present technology. For example, implementations of the present technology may be implemented without the user enjoying some of these technical effects, while other implementations may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of generating values of an overall evaluation criterion (OEC) to be used during a control/treatment testing of a computer-implemented service for selecting a current version of the computer-implemented service amongst a control and a treatment version of the computer-implemented service, the method being executable by a server, the method comprising:
   for each one of the control and treatment versions:
      receiving, by the server, a respective dataset indicative of user interactions of users with the respective one of the control and treatment versions;
      determining, by the server, a respective first set of values based on the respective dataset, values of the first sets being values of a first per-user metric; and
      determining, by the server, a respective second set of values based on the respective dataset, values of the second sets being values of a second per-user metric;
   selecting, by the server, a linearization value for a linearized per-user metric, the linearized per-user metric being a linear combination of the first and second per-user metrics, the OEC being based on the linearized per-user metric, the linearization value being between a control-ratio and a treatment-ratio,
      the control-ratio being a ratio of (i) an average value of the values of the first set of the control version over (ii) an average value of the values of the second set of the control version,
      the treatment-ratio being a ratio of (i) an average value of the values of the first set of the treatment version over (ii) an average value of the values of the second set of the treatment version;
   for each one of the control and treatment versions:
      determining, by the server, a respective linearized set of values, values in a given linearized set being differences between (i) the values of the respective first set from (ii) the values of the respective second set that are weighted by the linearization value, the values of the linearized sets being values of the linearized per-user metric; and
      generating, by the server, a respective value of the OEC based on the respective linearized sets, whereby a difference between the values of the OEC is indicative of (i) a magnitude of the change in the user interactions between the control version and the treatment version and (ii) a direction of the change in the user interactions between the control version and the treatment version, the direction being one of a positive direction and a negative direction;
   selecting, by the server, one of the control version and the treatment version as the current version of the computer-implemented service based on the direction of change in the user interactions between the control and the treatment versions; and
   providing, by the server, the current version of the computer-implemented service to the users of the computer-implemented service.

2. The method of claim 1, wherein the selecting the linearization value for the linearized per-user metric comprises:
   determining, by the server, one of the control-ratio and the treatment-ratio; and
   selecting, by the server, the one of the control-ratio and the treatment-ratio as the linearization value.

3. The method of claim 1, wherein the selecting the linearization value for the linearized per-user metric comprises:
   determining, by the server, a linearization value interval that comprises all values between the control-ratio and the treatment-ratio, inclusively; and
   selecting, by the server, any value in the linearization value interval as the linearization value.

4. The method of claim 1, wherein the method further comprises applying, by the server, a statistical significance test to determine a significance level of the difference between the values of the OEC.

5. The method of claim 4, wherein the statistical significance test is one of:
   a bootstrap test;
   a delta test; and
   a t-statistic test.

6. The method of claim 5, wherein the statistical significance test is the t-statistic test, and wherein the method further comprises:
   determining, for each one of the control and treatments versions, by the server, a respective sensitivity-enhanced set of values by applying a sensitivity-enhancing algorithm to the respective linearized set of values, and wherein generating the respective values of the OEC comprises:
   generating respective average values of values of the respective sensitivity-enhanced sets.

7. The method of claim 1, wherein one of the first and second per-user metrics is one of:
   a number of clicks per user;
   a number of queries per user; and
   a number of sessions per user.

8. The method of claim 1, wherein the linearized per-user metric is the linear combination of the first and second per-user metrics in accordance with:

$$L(u_i)=X(u_i)-\kappa^* Y(u_i)$$

where: L is the linearized per-user metric, X is the first per-user metric, Y is the second per-user metric and $\kappa$ is the linearization value.

9. A server for generating values of an overall evaluation criterion (OEC) to be used during a control/treatment testing of a computer-implemented service for selecting a current version of the computer-implemented service amongst a control and a treatment version of the computer-implemented service, the server being configured to:
   for each one of the control and treatment versions:
      receive a respective dataset indicative of user interactions of users with the respective one of the control and treatment versions;
      determine a respective first set of values based on the respective dataset, values of the first sets being values of a first per-user metric; and
      determine a respective second set of values based on the respective dataset, values of the second sets being values of a second per-user metric;
   select a linearization value for a linearized per-user metric, the linearized per-user metric being a linear combination of the first and second per-user metrics, the OEC being based on the linearized per-user metric, the linearization value being between a control-ratio and a treatment-ratio,
      the control-ratio being a ratio of (i) an average value of the values of the first set of the control version over (ii) an average value of the values of the second set of the control version,
      the treatment-ratio being a ratio of (i) an average value of the values of the first set of the treatment version over (ii) an average value of the values of the second set of the treatment version;
   for each one of the control and treatment versions:
      determine a respective linearized set of values, values in a given linearized set being differences between (i) the values of the respective first set from (ii) the values of the respective second set that are weighted by the linearization value, the values of the linearized sets being values of the linearized per-user metric; and
   generate a respective value of the OEC based on the respective linearized sets, whereby a difference between the values of the OEC is indicative of (i) a magnitude of the change in the user interactions between the control version and the treatment version and (ii) a direction of the change in the user interactions between the control version and the treatment version, the direction being one of a positive direction and a negative direction;
   select one of the control version and the treatment version as the current version of the computer-implemented service based on the direction of change in the user interactions between the control and the treatment versions; and
   provide the current version of the computer-implemented service to the users of the computer-implemented service.

10. The server of claim 9, wherein the server configured to select the linearization value for the linearized per-user metric further comprises the server being configured to:
    determine one of the control-ratio and the treatment-ratio; and
    select the one of the control-ratio and the treatment-ratio as the linearization value.

11. The server of claim 9, wherein the server configured to select the linearization value for the linearized per-user metric comprises the server being configured to:
    determine a linearization value interval that comprises all values between the control-ratio and the treatment-ratio, inclusively; and
    select any value in the linearization value interval as the linearization value.

12. The server of claim 9, wherein the server is further configured to apply a statistical significance test to determine a significance level of the difference between the values of the OEC.

13. The server of claim 12, wherein the statistical significance test is one of:
    a bootstrap test;
    a delta test; and
    a t-statistic test.

14. The server of claim 13, wherein the statistical significance test is the t-statistic test, and wherein the server is further configured to:
    determine, for each one of the control and treatments versions, a respective sensitivity-enhanced set of values by applying a sensitivity-enhancing algorithm to the respective linearized set of values, and wherein the server configured to generate the respective values of the OEC comprises the server being configured to:
    generate respective average values of values of the respective sensitivity-enhanced sets.

15. The server of claim 9, wherein one of the first and second per-user metrics is one of:
    a number of clicks per user;
    a number of queries per user; and
    a number of sessions per user.

16. The server of claim 9, wherein the linearized per-user metric is the linear combination of the first and second per-user metrics in accordance with:

$$L(u_i)=X(u_i)-\kappa^* Y(u_i)$$

where: L is the linearized per-user metric, X is the first per-user metric, Y is the second per-user metric and $\kappa$ is the linearization value.

\* \* \* \* \*